United States Patent Office 3,513,218
Patented May 19, 1970

3,513,218
OLEFIN DIMERIZATION
Volkert Faltings, Gelsenkirchen-Buer, Josef Ewers, Dorsten, Manfred Rolle, Neuhausel uber Koblenz, and Franz-Josef Meyer, Gladbeck, Germany, assignors to Scholven-Chemie Aktiengesellschaft, Gelsenkirchen-Buer, Germany, a corporation of Germany
No Drawing. Filed Sept. 1, 1966, Ser. No. 576,536
Claims priority, application Germany, Sept. 6, 1965, Sch 37,679
Int. Cl. C07c 3/10
U.S. Cl. 260—683.15                 12 Claims

ABSTRACT OF THE DISCLOSURE

A process of forming dimers of lower olefins, comprising bringing the monomeric olefins in contact, in a reaction zone, with a catalyst system comprising (a) a nickel compound, (b) an organoaluminum halide, and (c) an electron donor compound, in the presence of an organic solvent, and recovering the dimer after completion of the reaction, the organoaluminum compound having the formula $$Al_2R_nR'X_m$$

wherein R is an aklyl group, R' is alkyl or alkoxy, X is halogen, $m$ is a whole number and at least 2, and $n+m$ is equal to 5.

The process is particularly suited for the manufacture of ethylene and propylene dimers.

---

This invention relates to the production of dimers and higher oligomers of olefins, particularly lower olefins. It more particularly refers to the catalysis of this production by a novel catalyst system.

It is known that α-olefins can be oligomerized by "growing" a chain onto an aluminum trialkyl. It is further known that these higher alkyl radicals, so built by the oligomerization, can be displaced at high temperatures by lower alkyl radicals in a so-called displacement reaction. Thus, it is possible to produce higher molecular weight aliphatic chains by a telomerization reaction of lower α-olefins, and to recover these higher molecular weight products. It is also known that this same process can be carried out at lower temperatures if there is added to the reaction system finely divided nickel and/or cobalt or suitable compounds of these metals. It is known that propylene is dimerized by aluminum trialkyl principally to 2-methylpentene-1, since the aluminum triisohexyl that forms from aluminum tripropyl and propylene enters the displacement reaction with propylene to form methyl pentene and aluminum tripropyl more rapidly than it continues to react with propylene to form aluminum triisononyl. There is in the prior art a teaching that the dimerization of olefins with a central olefinic double bond can be catalyzed by aluminum trialkyls in the presence of certain transitional metal compounds.

It is furthermore known that the catalyst system composed of aluminum trialkyl and titanic or zirconic acid ester, or of pentamethyl cyclopentadienyl titanic acid triester, dimerizes ethylene, principally to butene-1. α-Olefins, especially ethylene, can be dimerized at elevated temperature in the presence of finely divided metallic nickel by means of organic aluminum compounds of the general formula AlRXY, wherein R stands for hydrocarbon radical, X represents a hydrocarbon radical bonded through an oxygen or sulfur atom, and Y stands for the same as X or halogen. The butene thus produced from ethene consists to 95% of butene-1. These prior art known processes have been found not to be entirely satisfactory. Some of these above-mentioned processes require relatively high temperatures and high pressures, and some also require long reaction times. Other of these processes have the disadvantage that the catalyst system used is not entirely soluble in the reaction medium. Also, the transformation rates achieved, with reference to the amounts of catalyst used, are not always satisfactory.

It is therefore an object of this invention to provide a novel process for the production of oligomers of lower olefins.

It is another object of this invention to provide a novel catalyst for the oligomerization of lower olefins.

It is a further object of this invention to provide a novel process for the production of principally dimers of lower olefins.

Other and additional objects of this invention will become apparent from a consideration of this entire specification including the claims appended hereto.

In accord with and fulfilling these objects, one aspect of this invention resides in the provision of a novel catalyst composition comprising a nickel compound and an organoaluminum halide of the following formula:

$$Al_2R_nR'X_m$$

wherein R is an alkyl radical, R' is an alkyl or alkoxy radical, X is a halogen, $n+m$ are equal to 5, and $m$ is a whole number of at least 2.

Whereas in the prior art, nickel compounds have been reduced by organic aluminum compounds to precipitate finely divided metallic nickel, it has surprisingly been found that in the reduction of nickel compounds with the organoaluminum halide of this invention in the presence of a lower olefin, the precipitation of metallic nickel does not take place, and instead a yellow to orange colored solution forms, which strongly absorbs propene with the formation of nearly 100% dimeric propene. The catalyst system that forms is soluble in the reaction medium and highly effective in the dimerization of α-olefins. It develops its activity without excessively high pressures and without the use of high temperatures.

It has furthermore been found that the effectiveness of the above-described catalyst system can be even further quite substantially improved by the addition thereto of electron donors, especially compounds of the $YR''_3$ type, wherein Y stands for an element of the Fifth Main Group of the periodic system, especially phosphorus or arsenic, and R" stands for a hydrocarbon radical or hydrogen. The hydrocarbon group is exemplified by alkyl or aryl groups, e.g. methyl, ethyl, propyl, butyl, phenyl, tolyl, xylyl, alkyl, phenyl, etc.

Out of the great number of possible catalyst combinations the following ssytems are listed as examples for use in the process according to the invention.

Nickel acetyl acetonate:
+triphenylphosphine+$Al_2R_3X_3$
+triphenylphosphine+$Al_2R_2X_4$
+triphenylphosphine+$Al_2R_2(OR3X_3$
+triphenylphosphine+$Al_2RX_5$
+triphenylphosphine+$Al_2R(OR)X_4$
+triphenylphosphine+$Al_2R_4X_2$
+triphenylarsine+$Al_2R_3X_3$
+tricyclohexylphosphine+$Al_2R_3X_3$ In the organic aluminum compounds, R in each case stands for alkyl and X for halogen. A nickel halide can also be used instead of nickel acetyl acetonate.

It is also possible to put the catalyst components (nickel compounds, electron donor and organic aluminum compound) together in a suitable solvent without the presence of olefin, and to use this pre-formed catalyst for the dimerization of olefin.

It has been found that, the more moles of an electron donor that are used per mole of the nickel compound, the greater is the activity of the catalyst system. Furthermore, it has been found that it is preferred to employ he organic aluminum compound in at least the same molecular amount as the electron donor. As the quantity of the organic aluminum compound increases, the activity of the catalyst system then increases. The quantity ratios are expediently adjusted to one another in such a manner that the molar ratio of nickel compound to electron donor is between about 1:6 and 1:18 and the molar ratio of the electron donor to the organic aluminum compound is between about 1:2 and 1:6. It is further within the scope of this invention to utilize even greater amounts of electron donor and organic aluminum compound which will further increase the catalytic activity, however economic considerations nevertheless weigh against the use of these larger amounts of the above-mentioned compounds since the proportion of catalytic activity increase is not economically warranted by the expense of the additional materials used.

The extraordinarily great activity of the catalyst system according to the invention is shown by examining the results of the catalyzed transformation reaction. For example, with 1 millimole (mmole) of nickel compound combined with 16 mmoles of triphenylphosphine and 45 mmoles of $Al_2(C_2H_5)_3Cl_3$, approximately 24 kg of propylene can be transformed, as it can be computed from the data given in Example 4.

The catalysts of this invention may be employed in solution. The exemplary solvents which can be used, are hydrocarbons, particularly aromatic hydrocarbons, such as benzene, toluene, chlorobenzene, etc., and halogen-substituted aliphatics such as dichloroethane, etc.

The temperature range in which the catalyst system according to the invention develops its activity extends from about $-80$ to $120°$ C.; a range between about $-40$ and $+80°$ C. is preferred. The process can be performed under both atmospheric pressure and under elevated pressures. At working temperatures below about $0°$ C., the use of elevated pressure is generally unnecessary, since sufficiently high olefin concentrations are produced in the solvent. At higher working temperatures, the use of a slightly elevated pressure is recommendable. In the case of the dimerization of propylene, for example, pressures up to about 15 atmospheres are to be considered as adequate. Higher pressures, however, can also be used. Care must be taken to see that the reaction system is free of oxygen and water.

A variant of the process consists in the fact that the nickel component can be used in an already wholly or partially reduced form, e.g., as bis-($\pi$-allyl)-nickel or $\pi$-allyl-nickel chloride.

The process of the invention is especially suitable for the dimerization of ethylene and propylene, but it can also be used, for example, for butene-1 and butene-2. The dimerization of propylene results, for example in more than 90% $C_6$ olefins, while the balance consists of trimeric propylene with small percentages of still higher oligomeric propylene. Analogous results on similar orders of magnitude are achieved in the use of the other olefins named.

The products manufactured by this process can be used, among other purposes, for improving the octane values in the low-boiling range of gasoline.

The above definition of R and R′ indicates that these moieties are alkyl or alkoxyl radicals. Such radicals are exemplified by methyl, ethyl, propyl, butyl, 2-ethyl hexyl, dodecyl, etc., and their alkoxy counterparts. It is preferred to use lower alkyl and alkoxy moieties having up to about 6 carbon atoms in their molecules.

The general process of this invention comprises introducing the olefin to be dimerized into a reactor which contains the solvent along with the nickel and the electron donor, and which is provided with an agitation mechanism and is refrigerated to $-10°$ C., to the saturation point after the air has been entirely displaced by nitrogen. Then, with agitation and the continued introduction of the olefin, the organic aluminum compound dissolved in the same solvent is dripped in over a short period of time. The olefin is used in excess; therefore it is best to operate in a closed system with a constant feedback of the excess olefin and the continual addition of enough fresh olefin so that a slight elevated pressure of about 20 to 30 mm. Hg prevails in the system. The temperature in the reaction chamber is kept at about $-10°$ C.

To perform the process batchwise at elevated temperature, the procedure is to place the solvent, the nickel compound and the electron donor in an autoclave under a nitrogen atmosphere. The nitrogen is then displaced by passing the appropriate olefin through the mixture. Then the autoclave, which is provided with a heating and cooling jacket, is brought to the reaction temperature. After this temperature is reached, the olefin is pumped in until the desired pressure is reached. Then, with the aid of a pressure lock, the organic aluminum compound dissolved in the same solvent is introduced into the autoclave in a short period of time. The dimerization reaction sets in immediately. By the constant pumping in of additional olefin the desired pressure is sustained in the reaction chamber. The desired temperature in the reactor is sustained by appropriate cooling through a heating and cooling jacket.

For the continuous performance of the process, the reaction mixture is put through a series of reaction chambers cascade-wise, for example, so that the product leaving the last reaction chamber carries away practically naught but completely exhausted catalyst.

The reaction mixture is then resolved by conventional means, such as distillation, the catalyst residues being left in the higher oligomeric slump product that forms in small quantity, which can be purified, e.g. by filtration or water washing. Purification by water washing is also possible for the entire reaction product, prior to purification by distillation.

This invention is illustrated by the following examples which are in no way limiting thereon.

EXAMPLE I 500 ml. of toluene and ¼ mmole of nickel acetyl acetonate are placed in a reactor which is flushed with pure nitrogen, has a 3-liter capacity, and is equipped with an agitator. Dry propene is then introduced to the saturation point with refrigeration to $-10°$ C., 22 liters of propene being absorbed. More propylene is fed into this solution with agitation, and 8 mmoles of $Al_2(C_2H_5)_3Cl_3$ dissloved in 10 ml. of toluene are dripped in within 5 minutes through a separatory funnel which is pressurized with pure nitrogen or argon. Propylene is absorbed greedily. Provision is made so that an excess of propylene is always emerging through the gas exhaust pipe. The rose-colored, clear solution is kept at $-10°$ C. by appropriate external refrigeration. After 13 hours the absorption of propylene has terminated. After the separation of the propylene still in solution, 900 g. can be obtained of a section that boils between 58 and $68°$ C.

EXAMPLE II

The process is performed as in Example I. The components of the catalyst are changed. $\frac{1}{16}$ mmole of nickel acetyl acetonate and $\frac{9}{16}$ mmole of triphenylphosphine are dissolved in 500 ml. of toluene. 2 mmoles of $Al_2(C_2H_5)_3Cl_3$ are introduced for reduction. A clear, yellow-orange solution develops. Another change consists in the fact that the process is performed in a closed system with a circulating pump that pumps 70 to 75 l./h. of gas. The unconsumed gas, therefore, is returned to the reaction flask. The pressure in the system is maintained at 24 mm. Hg by the constant addition of fresh propylene. After 9.5 hours the catalyst becomes inactive.

Both from the gas consumption and from the increase in the weight of the reaction mixture after the removal of the propylene still in solution it is determined that 994 g. of propylene have been transformed. The following are recovered by distillative purification:

904 g. of a section boiling between 58 and 68° C.;
90 g. of a product boiling higher than toluene.

The 904 g. have the following composition:

| | Wt. percent |
|---|---|
| 4-methylpentene-1 | 3.8 |
| 2,3-dimethylbutene | 5.2 |
| 4-methylpentene-2 | 37.2 |
| 2-methylpentene-1 | 17.9 |
| 3-hexene | 7.7 |
| 2-methylpentene-2 | 21.0 |
| 2-hexene | 6.8 |
| 2,3-dimethylbutene-2 | 0.4 |

EXAMPLE III 500 ml. of toluene, in which $\frac{1}{32}$ mmole of nickel acetyl acetonate and $\frac{8}{32}$ mmole of triphenylphosphine are dissolved, are placed in a two-liter pressure vessel flushed with pure nitrogen. Propylene is passed through the mixture to displace nitrogen. The reactor content is then heated to 60° C. with the aid of a heating jacket and propylene is pumped in with agitation until a pressure of 10 atmospheres is indicated. 20 to 25 wt. percent of propylene is then dissolved in the toluene. Then, with the aid of a pressure lock, 1 mmole of $Al_2(C_2H_5)_3Cl_3$ dissolved in 10 ml. of toluene is fed in over a period of a few minutes. The immediately dropping pressure is sustained at 10 atmospheres by pumping in sufficient propylene. The heat that develops is carried away by the cooling jacket and the reactor content is held at 60° C. After 70 minutes the absorption of propylene has ended. In all, 853 g. of propylene have been introduced into the pressure vessel. After cooling to room temperature and depressurizing and stabilizing the liquid that is drawn off, 349 g. of propylene are recovered. Accordingly, 504 g. of propylene have been transformed. In the distillative separation, 458 g. are obtained of a fraction boiling between 58 and 68° C.

EXAMPLE IV

The performance of the process is analogous to the one in Example III. The only changes are in the quantities and ratios of the catalyst components. $\frac{1}{40}$ mmole of nickel acetyl acetonate and $\frac{16}{40}$ mmole of triphenylphosphine are dissolved in the 500 ml. of toluene. After raising the temperature and pumping in propylene as in Example III, $\frac{45}{40}$ mmoles of $Al_2(C_2H_5)_3Cl_3$ are let into the pressure vessel through a pressure lock. The propylene absorption which immediately commences comes to an end after 2 hours. A total of 598 g. of propylene have been transformed. 545 g. of distillate are obtained, which boils between 58 and 68° C.

EXAMPLE V

This example is performed in the same way as Example II. $\frac{1}{16}$ mmole of nickel acetyl acetonate, 1 mmole of triphenylphosphine and 4 mmoles of $Al_2(C_2H_5)_3Cl_3$ are used. A clear, pale yellow solution develops. 1190 g. of propylene are transformed within 11 hours.

EXAMPLE VI

Performance is same as in Example II. ¼ mmole of nickel acetyl acetonate, 2 mmoles of triphenylarsine and 8 mmoles of $Al_2(C_2H_5)_3Cl_3$ are used as the catalyst. A golden yellow, clear solution developes. 1088 g. of propylene transformed within 19 hours.

EXAMPLE VII

Performance is same as Example II. ¼ mmole of nickel acetyl acetonate, 2 mmoles of triphenyl phosphine and 8 mmoles of $Al_2(C_2H_5)_2Cl_4$ are used as catalyst components. A clear, yellow solution develops. Within 4 hours 1366 g. of propylene are transformed.

EXAMPLE VIII

This example is also performed in the same manner as Example II. The catalyst consists of one quarter of a mmole of nickel acetyl acetonate, 2 mmoles of triphenylphosphine and 8 mmoles of $Al_2(C_2H_5)_2(OC_2H_5)Cl_3$. 645 g. of propylene are transformed within 11 hours.

EXAMPLE IX

This example is also performed as in Example II. The catalyst components, however, are a quarter of a mmole of bis-($\pi$-allyl) nickel, 2 mmoles of triphenylphosphine and 8 mmoles of $Al_2(C_2H_5)_3Cl_3$. 1790 g. of propylene are transformed in 13 hours.

EXAMPLE X

The catalyst components of this example, which is performed like Example II, are made up of one quarter mmole of $\pi$-allyl nickel chloride, 2 mmoles of triphenylphosphine and 8 mmoles of $Al_2(C_2H_5)_3Cl_3$. A clear, yellow solution develops, with a few yellow-colored segregations which attach themselves to the reactor wall. The system shows propylene absorption like Example IX.

EXAMPLE XI

The performance of this example is the same as Example I. The catalyst system consists of 5 mmoles of $NiBr_2$, 5 mmoles of triphenylphosphine and 10 mmoles of $Al_2(C_2H_5)_3Cl_3$. The toluene used was saturated with propylene at −30° C. before the reductant was added. After the reductant is added, a yellow solution develops with a gray-brown precipitate. The system absorbs greedily at −30° C.

EXAMPLE XII 2 mmoles of $Al_2(C_2H_5)_3Cl_3$ are placed at room temperature in 20 ml. of toluene in which $\frac{1}{16}$ mmole of nickel acetyl acetonate and ½ mmole of triphenylphosphine are dissolved. This solution is fed over a short period of time, with agitation, into 480 ml. of toluene which has previously been saturated at −10° C. with propylene and which is contained in a reactor with a 3-liter capacity. A yellow solution develops, which greedily absorbs propylene, which is fed in at a corresponding rate. Within 7 hours 560 g. of propylene are transformed.

EXAMPLE XIII 475 ml. of toluene in which $\frac{1}{64}$ mmole of nickel acetyl acetonate and $\frac{8}{64}$ mmole of triphenylphosphine are dissolved, are fed into a 2-liter pressure vessel which is flushed with pure nitrogen and is equipped with an agitator. Ethylene is fed through to displace the nitrogen. Then the mixture is cooled to 14° C. and, with the agitator running, ethylene is pumped in until 13 atmospheres are indicated. One half of a millimole of $Al_2(C_2H_5)_3Cl_3$, dissolved in 25 ml. of toluene is introduced through a pressure lock. The pressure, which immediately falls off rapidly, is sustained at 13 atmospheres by pumping in additional ethylene. In spite of the most intensive cooling with cold water (approx. 13° C.) in a cooling jacket, the temperature rises to 85° C.

Ethylene continues to be absorbed rapidly. After 15 minutes, the ethylene feed is stopped. The catalyst system is still active. After cooling and relieving of the pressure, a liquid is obtained in which only traces of ethylene can still be found. 800 g. are butenes. 95% of the resultant butenes consist of butene-2.

What is claimed is:
1. The process of forming dimers of lower olefins comprising introducing a continuous supply of at least one mono-olefin into a reaction zone, wherein the mono-olefin is brought in contact with a catalyst system comprising (a) a nickel compound selected from the group consisting of nickel acetylacetonate and nickel halides, (b) an organoaluminum halide, (c) an electron donor compound and (d) an organic solvent, the said nickel compound being reduced during the reaction, and recovering the dimer after completion of the reaction, the organo-aluminum compound having the formula $$Al_2R_nR'X_m$$

wherein R is an alkyl group, R' is alkyl or alkoxy, X is halogen, $m$ is a whole number and at least 2, and $n+m$ is equal to 5, the electron donor compound having the formula $YR''_3$ wherein Y is arsenic or phosphorus and R' is hydrogen or a hydrocarbon radical and the molecular ratio of said nickel compound to said electron donor compound is between about 1:6 and 1:18.

2. The process of claim 1, wherein the ratio of electron donor compound to organoaluminum halide is between about 1:2 to 1:6.

3. The process of claim 1 wherein the olefin is ethylene, propylene, butene-1 or butene-2.

4. The process of claim 1 wherein the temperature ol the reaction is between about −80 to 120° C.

5. The process of claim 1 wherein the solvent is benzene, toluene, chlorobenzene or dichloroethane.

6. The process of claim 1 wherein the reaction is carried out at a pressure between about 0 and 15 atmosphere gauge.

7. The process of claim 1 wherein the alkyl moiety of said R and said R' in said organoaluminum halide is methyl, ethyl, butyl, 2-ethyl hexyl, or dodecyl.

8. The process of claim 7 wherein the organo-aluminum compound is an aluminumethylchloride.

9. The process of claim 8 wherein the organoaluminum compound is dialuminumtriethyltrichloride.

10. The process of claim 1 wherein the hydrocarbon radical of the electron donor compound is methyl, ethyl, butyl, phenyl, tolyl xylyl, or alkyl phenyl.

11. The process of claim 1 wherein the electron donor compound is triphenylphosphine.

12. The process of claim 1 wherein the nickel compound is nickel acetylacetonate, the organoaluminum compound is dialuminumtriethyltrichloride, and the electron donor compound is triphenylphosphine.

References Cited
UNITED STATES PATENTS

| | | | |
|---|---|---|---|
| 3,379,706 | 4/1968 | Wilke | 260—683.15 X |
| 3,390,201 | 6/1968 | Drew | 260—676 |
| 3,355,510 | 11/1967 | Cannell et al. | |

PAUL M. COUGHLAN, Jr., Primary Examiner

U.S. Cl. X.R.

252—431